United States Patent
Rosen et al.

(10) Patent No.: US 11,327,385 B2
(45) Date of Patent: May 10, 2022

(54) POLARIZATION-INSENSITIVE PHASE MODULATOR

(71) Applicant: OPTICA AMUKA (A.A.) LTD., Petach Tikva (IL)

(72) Inventors: Shamir Rosen, Ramat Gan (IL); Yoav Yadin, Ganey Tikva (IL); Yariv Haddad, Raanana (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 906 days.

(21) Appl. No.: 16/080,309

(22) PCT Filed: Mar. 13, 2017

(86) PCT No.: PCT/IB2017/051435
§ 371 (c)(1),
(2) Date: Aug. 28, 2018

(87) PCT Pub. No.: WO2017/158486
PCT Pub. Date: Sep. 21, 2017

(65) Prior Publication Data
US 2021/0199992 A1 Jul. 1, 2021

Related U.S. Application Data

(63) Continuation-in-part of application No. 14/428,426, filed as application No. PCT/IB2013/058989 on Sep. 30, 2013, now Pat. No. 10,036,901.
(Continued)

(51) Int. Cl.
*G02F 1/29* (2006.01)
*G02C 7/08* (2006.01)
(Continued)

(52) U.S. Cl.
CPC ............ *G02F 1/294* (2021.01); *C09K 19/586* (2013.01); *G02C 7/083* (2013.01); *G02F 1/1396* (2013.01);
(Continued)

(58) Field of Classification Search
None
See application file for complete search history.

(56) References Cited

U.S. PATENT DOCUMENTS 9,335,562 B2   5/2016   Pugh et al.
2008/0170203 A1   7/2008   Esser et al.
(Continued)

FOREIGN PATENT DOCUMENTS

CA    2863406 A1    3/2015
WO    2010139995 A1    12/2010
WO    2014049577 A1    4/2014

OTHER PUBLICATIONS

International Application # PCT/IB2017/051435 search report dated Jun. 19, 2017.
(Continued)

*Primary Examiner* — Ryan Crockett
(74) *Attorney, Agent, or Firm* — Kligler & Associates Patent Attorneys Ltd (57) ABSTRACT

An optical device (20) includes an electro-optical layer, including a liquid crystal material (24) with a heliconical structure having a pitch that is less than 250 nm and is modifiable by an electric field. An array of excitation electrodes (28) extends over the electro-optical layer. Control circuitry (23) is coupled to apply control voltage waveforms to the excitation electrodes and is configured to modify the control voltage waveforms so as to locally modify a mol-
(Continued)

ecule director angle of the heliconical structure and thus to generate a specified phase modulation profile in the electro-optical layer.

12 Claims, 4 Drawing Sheets

Related U.S. Application Data (60) Provisional application No. 62/308,903, filed on Mar. 16, 2016, provisional application No. 61/707,962, filed on Sep. 30, 2012.

(51) Int. Cl.
| | |
|---|---|
| *C09K 19/58* | (2006.01) |
| *G02F 1/1343* | (2006.01) |
| *G02F 1/139* | (2006.01) |
| *G02F 1/133* | (2006.01) |

(52) U.S. Cl.
CPC .... *G02F 1/13306* (2013.01); *G02F 1/134309* (2013.01); *G02F 2202/06* (2013.01); *G02F 2203/06* (2013.01); *G02F 2203/07* (2013.01); *G02F 2203/50* (2013.01)

(56) References Cited

U.S. PATENT DOCUMENTS

| | | | | |
|---|---|---|---|---|
| 2010/0149444 | A1* | 6/2010 | Hikmet | G02F 1/134363 349/15 |
| 2010/0157181 | A1* | 6/2010 | Takahashi | G02B 30/27 349/33 |
| 2012/0327356 | A1 | 12/2012 | Rossini et al. | |
| 2013/0166025 | A1* | 6/2013 | Pugh | G02C 7/083 623/6.22 |
| 2015/0029424 | A1* | 1/2015 | Gordon | G02F 1/133305 349/13 |
| 2018/0129018 | A1* | 5/2018 | Cheng | G02B 27/286 |

OTHER PUBLICATIONS

Xiang et al ., "Electrically tunable selective reflection of light from ultraviolet to visible and infrared by heliconical cholesterics". Advanced Materials, vol. 27, issue 19, pp. 3014-3018, year 2015.

Chen et al., "Chiral heliconical ground state of nanoscale pitch in a nematic liquid crystal of achiral molecular dimers", Proceedings of the National Academy of Sciences of the U.S.A., vol. 110, No. 40, pp. 15931-15936 , Oct. 1, 2013.

Borshch et al., "Nematic twist-bend phase with nanoscale modulation of molecular orientation", Nature Communications, 8 pages, Nov. 5, 2013.

Chen et al., "Twist-bend heliconical chiral nematic liquid crystal phase of an achiral rigid bent-core mesogen", Physical Review E 89, p. 022506-1-022506-5, year 2014.

Yang et al., "Fundamentals of Liquid Crystal Devices", 397 pages, Publisher Wiley Chichester, year 2006.

PI-1211, produced by Nissan Chemical Industries Ltd., Japan ??

Heliconical liquid crystal material 24 are manufactured by Merck & Co., Inc., Kenilworth, N.J., USA. ??

Shiyanovskii et al., "Electrooptics of Oblique Helicoidal Structures in Chiral Nematic Cells", SID Digest, pp. 1628-1631, year 2016.

* cited by examiner

POLARIZATION-INSENSITIVE PHASE MODULATOR

CROSS-REFERENCE TO RELATED APPLICATION

This application claims the benefit of U.S. Provisional Patent Application 62/308,903, filed Mar. 16, 2016, which is incorporated herein by reference. This application is a Continuation in Part of U.S. patent application Ser. No. 14/428,426, filed in the national phase of PCT Patent Application PCT/IB2013/058989, filed Sep. 30, 2013, which claims the benefit of U.S. Provisional Patent Application 61/707,962, filed Sep. 30, 2012, which is incorporated herein by reference.

FIELD OF THE INVENTION

The present invention relates generally to electro-optical devices, and particularly to optical phase modulators.

BACKGROUND

A dynamic phase modulator is an optical device that allows phase modulation of transmitted light, wherein the phase modulation is electronically controllable. Among its various applications are optical modulators for communication and wave front shaping for optical uses such as microscopy, astrophysics and optometry. One sought-after application is an electrically-controlled dynamic lens.

U.S. Pat. No. 9,335,562 describes methods and apparatus for providing a variable optic insert into an ophthalmic lens. A liquid crystal layer may be used to provide a variable optic function, and in some embodiments the liquid crystal layer may comprise polymer networked regions of interstitially located liquid crystal material.

SUMMARY

Embodiments of the present invention that are described hereinbelow provide phase modulators that are independent of the polarization of incident light.

There is therefore provided, in accordance with an embodiment of the invention, an optical device, which includes an electro-optical layer, including a liquid crystal material with a heliconical structure having a pitch that is less than 250 nm and is modifiable by an electric field. An array of excitation electrodes extends over the electro-optical layer. Control circuitry is coupled to apply control voltage waveforms to the excitation electrodes and is configured to modify the control voltage waveforms so as to locally modify a molecule director angle of the heliconical structure and thus to generate a specified phase modulation profile in the electro-optical layer.

In a disclosed embodiment, the liquid crystal material includes a combination of one or more liquid crystals and a chiral additive. Alternatively, the liquid crystal material comprises a chiral liquid crystal.

Typically, the phase modulation profile is independent of a polarization of the incident light.

In some embodiments, the control circuitry is configured to apply the control voltage waveforms to the excitation electrodes so that the device functions as a lens, having focal properties determined by the phase modulation profile, for example an ophthalmic lens with an electrically controllable focal length.

There is also provided, in accordance with an embodiment of the invention, an optical device, including a first polarization-dependent lens, which include a first electro-optical layer, which is configured to refract a first polarization component of light propagating along an optical path, with an effective first local index of refraction at any given location that is determined by first control voltage waveforms applied across the first electro-optical layer, and a first array of excitation electrodes extending across the first electro-optical layer. A second polarization-dependent lens is arranged in series with the first polarization-dependent lens along the optical path and includes a second electro-optical layer, which is configured to refract a second polarization component of the light, orthogonal to the first polarization component, with an effective second local index of refraction at any given location that is determined by second control voltage waveforms applied across the second electro-optical layer, and a second array of excitation electrodes extending across the second electro-optical layer. Control circuitry is coupled to apply the first and second control voltage waveforms respectively to the first and second arrays of the excitation electrodes and is configured to modify the first and second control voltage waveforms so as to generate a specified phase modulation profile in the first and second electro-optical layers.

In some embodiments, the specified phase modulation profile includes a first phase modulation profile that is generated in the first electro-optical layer by the first control voltage waveforms and defines a first focal length of the first lens and a second phase modulation profile that is generated in the second electro-optical layer by the second control voltage waveforms and defines a second focal length of the second lens. Typically, the first and second polarization-dependent lenses are positioned at respective locations that are separated by a predefined distance along the optical path, and the first and second control voltage waveforms are selected to determine the first and second focal lengths so that a difference between the first and second focal lengths compensates for the predefined distance in forming respective first and second images at a focal plane. In a disclosed embodiment, the first and second polarization-dependent lenses are configured to serve as an ophthalmic lens with an electrically-controllable focal length, and the first and second focal lengths are chosen so that both the first and second polarization components are imaged on a retina of a user of the ophthalmic lens with equal magnifications.

There is additionally provided, in accordance with an embodiment of the invention, a method for producing an optical device. The method includes providing an electro-optical layer, including a liquid crystal material with a heliconical structure having a pitch that is less than 250 nm and is modifiable by an electric field. An array of excitation electrodes is positioned to extend over the electro-optical layer. Control circuitry is coupled to apply control voltage waveforms to the excitation electrodes and to modify the control voltage waveforms so as to locally modify a molecule director angle of the heliconical structure and thus to generate a specified phase modulation profile in the electro-optical layer.

There is further provided, in accordance with an embodiment of the invention, a method for producing an optical device. The method includes providing a first polarization-dependent lens, which includes a first electro-optical layer, which is configured to refract a first polarization component of light propagating along an optical path, with an effective first local index of refraction at any given location that is determined by first control voltage waveforms applied across the first electro-optical layer, and a first array of excitation electrodes extending across the first electro-optical layer. A second polarization-dependent lens is arranged in series with the first polarization-dependent lens along the optical path. The second polarization-dependent lens includes a second electro-optical layer, which is configured to refract a second polarization component of the light, orthogonal to the first polarization component, with an effective second local index of refraction at any given location that is determined by second control voltage waveforms applied across the second electro-optical layer, and a second array of excitation electrodes extending across the second electro-optical layer. Control circuitry is coupled to apply the first and second control voltage waveforms respectively to the first and second arrays of the excitation electrodes and to modify the first and second control voltage waveforms so as to generate a specified phase modulation profile in the first and second electro-optical layers.

The present invention will be more fully understood from the following detailed description of the embodiments thereof, taken together with the drawings in which:

DETAILED DESCRIPTION OF EMBODIMENTS

Overview

When dynamic lenses, for example the dynamic lens described in the above-mentioned PCT Patent Application PCT/IB2013/058989, are based on birefringent materials, such as nematic liquid crystals, they typically operate only on polarized light. In order to modulate the phases of both polarizations, two such devices can be stacked with their directions of polarization crossed. In this case, however, the necessary spacing between the two devices affects the relative magnifications of the imaging system in the two polarizations.

As another possible solution to the problem of polarization-dependence, a dynamic lens could be based on cholesteric liquid crystals (CLC), which have an axially symmetrical helical structure when no voltage is applied across the layer of liquid crystal. In this state the optical path length across the CLC, and therefore the optical phase change, is independent of the polarization of the incident light. However, when a voltage is applied across a traditional CLC material, the liquid crystal material switches to an intermediate state, such as a focal conic state or a fingerprint state. These states are disordered and therefore scatter the incident light. Further increasing the voltage results in a homeotropic state, in which all the molecules are mutually parallel, with the common direction of the molecules perpendicular to the walls of the liquid crystal cell. As a result, continuous electronic control of the focal properties of a dynamic lens based on a traditional CLC material is generally not feasible.

The embodiments of the present invention that are described herein address these problems by providing electronically controllable optics that are polarization-independent.

In some embodiments of the present invention, polarization-independence is achieved using a novel liquid crystal material with a heliconical structure having a pitch that is less than 250 nm. The pitch and director angle of the liquid crystal molecules are modifiable by an electric field. An array of excitation electrodes extends over the layer of liquid crystal. Control circuitry is coupled to apply control voltage waveforms to the excitation electrodes and is configured to modify these waveforms so as to modify the director angle and and/or pitch of the liquid crystal material and thus generate a specified phase modulation profile in the liquid crystal layer.

In other embodiments of the present invention, the polarization-independence is achieved by stacking two polarization-dependent lenses in series along the optical path, with orthogonal polarization axes. Each lens comprises an electro-optical layer with an array of excitation electrodes extending over the layer. Control circuitry is coupled to apply control voltage waveforms to the arrays of excitation electrodes and is configured to modify the control voltage waveforms so as to generate a specified phase modulation profile in each of the electro-optical layers. In some of these embodiments, the control voltage waveforms are chosen so that the two lenses have different focal powers, so that both polarizations are imaged with the same magnification to avoid a doubling of the image.

Polarization-Independence Using Heliconical Liquid Crystals

Figure 1:
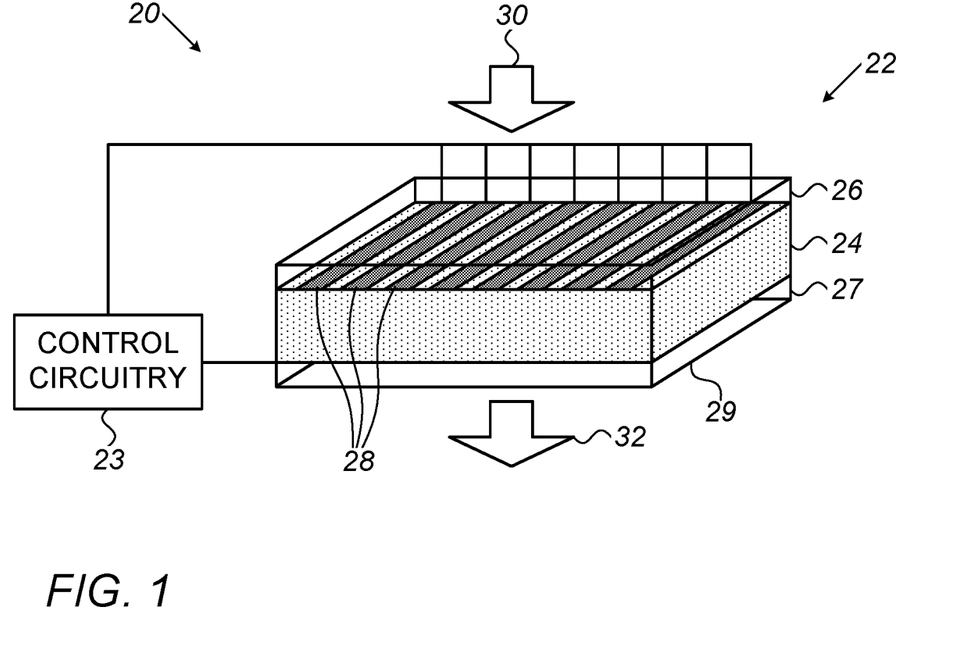
FIG. 1 is a schematic perspective view of an optical device, in accordance with an embodiment of the present invention.

FIG. 1 is a schematic perspective view of an optical device 20, in accordance with an embodiment of the present invention. Optical device 20 comprises an optical phase modulator 22 and control circuitry 23. Optical phase modulator 22 comprises a layer of a heliconical liquid crystal material 24 sandwiched between an upper substrate 26 and a lower substrate 27, wherein the substrates comprise a transparent material, for example, glass. Substrates 26 and 27 can be coated on their insides with a polyimide alignment layer, for example PI-1211, produced by Nissan Chemical Industries Ltd., Japan (not shown). Liquid crystal material 24 is typically contained by suitable encapsulation, as is known in the art.

Light impinges on optical phase modulator 22 as an incident light 30, and exits the phase modulator as a transmitted light 32. The optical phase of transmitted light 32 is locally modified, with respect to the optical phase of incident light 30, by the local optical path through liquid crystal material 24. The local optical path is modified in response to applied control voltage waveforms, as will be detailed below.

Excitation electrodes 28 and 29 are disposed respectively over substrates 26 and 27. Excitation electrodes 28 and 29 comprise a transparent, conductive material, such as indium tin oxide (ITO), as is known in the art. Alternatively, non-transparent excitation electrodes may be used, as long as they are thin enough so that they do not cause disturbing optical effects.

Excitation electrodes 28 in this embodiment are arranged as an array of parallel stripes. ("Parallel" in this context may include, as well, excitation electrodes that deviate in angle by several degrees.) For example, the electrode pattern shown in FIG. 1 may be formed by lithography on substrate 26. Although excitation electrodes 28 are shown in FIG. 1 as having uniform shape and spacing, the stripes may alternatively have varying sizes and/or pitch. Alternatively, any other suitable electrode arrangements may be used (for example, concentric ring-shaped electrodes). In an embodiment of the present invention, excitation electrode 29 (not visible in FIG. 1) is disposed and formed as a uniform layer on substrate 27, functioning as an electrical ground plane. Alternatively, the excitation electrodes on substrate 27 may comprise stripes, which are typically oriented perpendicularly to electrodes 28, or may be formed in any other suitable pattern.

After forming excitation electrodes 28 and 29, substrates 26 and 27 are cemented together at a predefined distance, typically a few microns, by using cements and/or etched spacers as are known in the art. Liquid crystal material 24 is then inserted and sealed in the gap between the substrates. Although for the sake of visual clarity, only a few excitation electrodes 28 are shown in FIG. 1, in practice, for good optical quality, optical phase modulator 22 will typically comprise at least 100 stripe electrodes for excitation, and possibly even 400 or more.

Control circuitry 23 is coupled to each of excitation electrodes 28 and 29, and is configured to apply control voltage waveforms to the excitation electrodes for modifying the local optical phase modulation through liquid crystal material 24 in response to the local control voltage waveform.

The pictured embodiment combining striped excitation electrodes 28 and uniform electrode 29 enables optical device 20 to function as a one-dimensional optical phase modulator. In an embodiment of the present invention, optical device 20, as a one-dimensional phase modulator, emulates a cylindrical lens. The focal length of the cylindrical lens and the position of the focal line in a direction orthogonal to the line are determined by the phase modulation profile, which is induced in liquid crystal material 24 by the control voltage waveforms that control circuitry 23 applies to excitation electrodes 28. Alternatively, other control voltage waveforms may be applied to emulate lenses yielding other one-dimensional wavefronts, including free-form one-dimensional lenses.

In some embodiments of the present invention, a two-dimensional optical phase modulator (not shown) is assembled from two identical or similar one-dimensional phase modulators 22 by stacking them in series, with the directions of their striped excitation electrodes 28 orthogonal to each other. Control circuitry 23 is in this embodiment coupled to both optical phase modulators 22. The control voltage waveforms applied by control circuitry 23 across excitation electrodes 28 and 29 of the two optical phase modulators 22 may be chosen so as to yield a phase modulation profile that is circularly symmetrical, thus emulating a spherical lens. The focal length, as well as the position of the focal spot in the focal plane, may be adjusted by the control voltage waveforms applied by control circuitry 23 across each of a set of excitation electrodes 28 and 29 of the two optical phase modulators 22. Alternatively, different, symmetrical or non-symmetrical, patterns of control voltage waveforms may be applied so that the combination of two orthogonal optical phase modulators 22 emulates, for example, an astigmatic lens, an aspheric lens, a toric lens, a lenslet array, or a free-form lens.

In an alternative embodiment of the present invention, as mentioned above, excitation electrodes 29 are formed as parallel stripes, similar to excitation electrodes 28, but running in a direction orthogonal to excitation electrodes 28. This embodiment enables a single optical phase modulator 22 to function as a two-dimensional phase modulator. When suitable control voltage waveforms are applied by controller 23 across excitation electrodes 28 and 29, optical phase modulator 22 may emulate, for example, a spherical lens, an astigmatic lens, an aspheric lens, a toric lens, a lenslet array, or a free-form lens. By applying a constant control voltage waveform by controller 23 to all of excitation electrodes 28 or to all of excitation electrodes 29, optical phase modulator 22 reverts to functioning as a one-dimensional phase modulator, whose functions were described above.

Similarly to excitation electrodes 28, the stripes of excitation electrodes 29 may alternatively have varying sizes and/or pitch, or any other suitable electrode arrangements may be used.

Control circuitry 23 typically comprises amplifiers and/or switches, as are known in the art, which control either the amplitude or the duty cycle, or both, of the voltage that is applied to each of electrodes 28 and 29. The pattern of amplitudes and/or duty cycles applied to the excitation electrodes determines the phase modulation profile of liquid crystal material 24. The circuit components in control circuitry 23 are typically fabricated as a silicon chip. Control circuitry 23 may be located separately from optical phase modulator 22, and connected to each of excitation electrodes 28 and 29 by suitable bonding wires or other connections, as is shown in FIG. 1. Alternatively, control circuitry 23 may be cemented onto one of substrates 26 or 27, and connected to each of excitation electrodes 28 and 29 by suitable bonding wires or other connections (not shown). Control circuitry 23 can be located at the side of the array of excitation electrodes 28 or 29, and there is no need for any parts of the control circuitry to be located over the active area of layer 24.

Control circuitry 23 is configured to modify the control voltage waveforms applied to each of excitation electrodes 28 and 29 concurrently and independently. This concurrent driving may apply to all of the electrodes as a group (in which case the control voltage waveforms of all the electrodes are updated together) or to sub-groups of the electrodes. For example, control circuitry 23 may update the control voltage waveforms applied to all the odd excitation electrodes in the array alternately with all the even excitation electrodes. This sort of approach scales readily to large electrode counts, and can thus be used to create electrically-tunable optical systems with high pixel counts and fine resolution.

Figure 2:
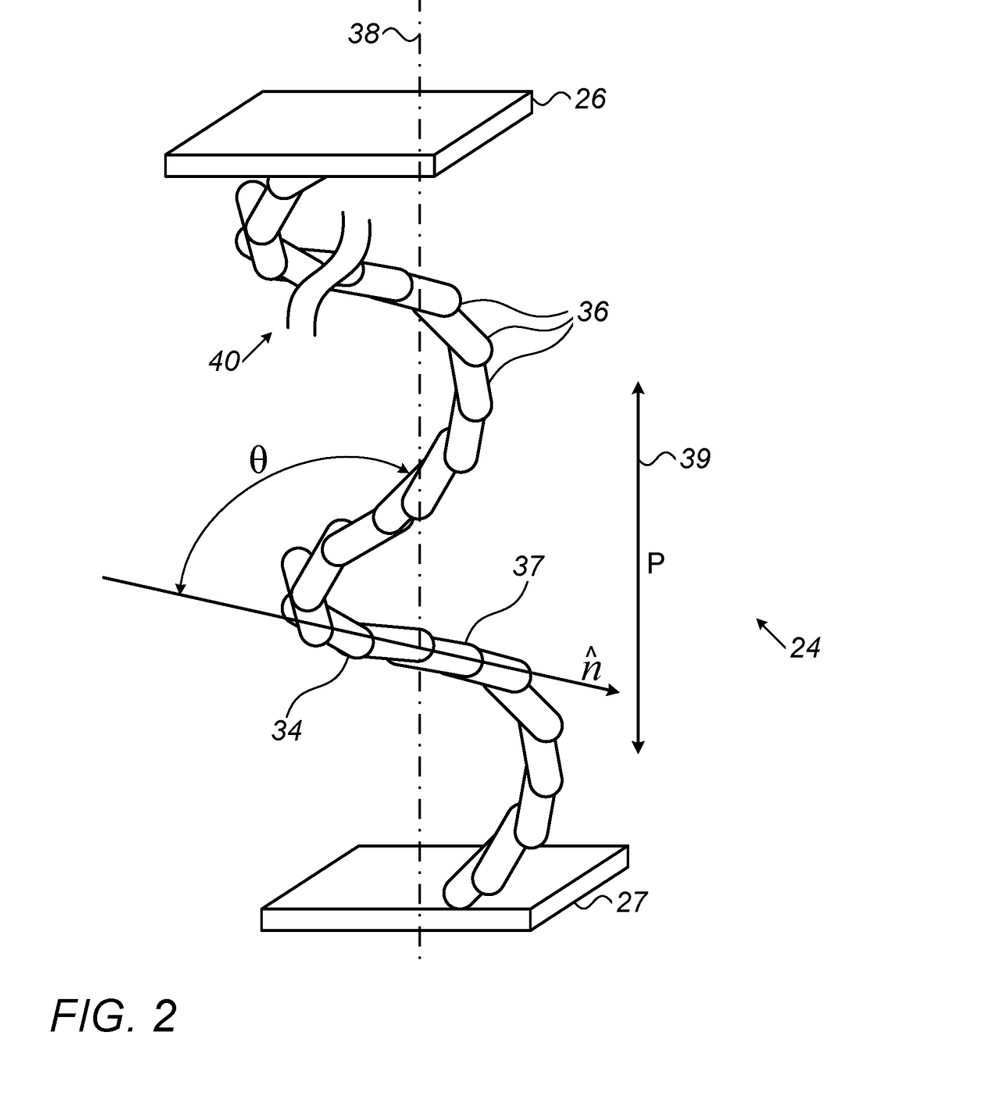
FIG. 2 is a schematic perspective view of the structure of a heliconical liquid crystal material used in a polarization-independent optical phase modulator, in accordance with an embodiment of the present invention.

FIG. 2 is a schematic perspective view of the structure of heliconical liquid crystal material 24, in accordance with an embodiment of the present invention. Heliconical (also known as "oblique helicoidal") liquid crystal material 24 has recently been reported by Xiang et al. in "Electrically tunable selective reflection of light from ultraviolet to visible and infrared by heliconical cholesterics", *Advanced Materials* 27, pp. 3014-3018 (2015).

A chain 34 of molecules 36 of heliconical liquid crystal material 24 is shown schematically between substrates 26 and 27. A director n̂, which is a unit vector 37 along the local orientation of the molecules of liquid crystal material 24, rotates around a helicoidal axis 38 as it follows chain 34 of molecules 36, defining a tilt angle $\theta$ with the axis, also referred to as the molecule director angle. For heliconical liquid crystal material 24, tilt angle $\theta$ is less than 90° (as opposed to CLC, where $\theta=90°$). A pitch P, denoted by a double-arrow 39, of heliconical liquid crystal material 24 can be very short, for example less than 250 nm. A break 40 in chain 34 indicates that in reality there are many more periods of heliconical liquid crystal material 24 (from tens to hundreds of periods between substrates 26 and 27 than the 1-2 periods that are drawn in FIG. 2. Due to the short helical pitch P, heliconical liquid crystal material 24 is polarization-independent for light that enters device 20 along helicoidal axis 38.

Another advantage of using a pitch P that is less than 250 nm relates to Bragg-reflections from the periodic structure of heliconical liquid crystal material 24. Bragg-reflections take place for light incident on the liquid crystal along helicoidal axis 38 in a spectral band centered at a so-called Bragg-wavelength $\lambda_{Bragg} = n_{ave} \times P$, wherein $n_{ave}$ is the average refractive index of the heliconical liquid crystal material. Using a typical value of $n_{ave} = 1.65$ and a pitch P=200 nm, the Bragg-wavelength is $\lambda_{Bragg} = 330$ nm. The reflected light is well in the ultra-violet (UV) region of the spectrum, ensuring that incident light in the visible spectrum will pass through optical phase modulator 22 without significant losses from Bragg-reflections.

Heliconical liquid crystal material 24, as suggested by Xiang et al., for example, comprises a mixture of two dimeric liquid crystals: (1',7'-bis(4-cyanobiphenyl-4'-yl) heptane (CB7CB) and 1-(4-cyanobiphenyl-4'-yl)-6-(4cyanobiphenyl-4'-yloxy)hexane (CB6OCB)), and a standard liquid crystal, pentylcyanobiphenyle (5CB). The mixture is doped with a left-handed chiral additive S811, which determines the pitch. All of the above components of heliconical liquid crystal material 24 are manufactured by Merck & Co., Inc., Kenilworth, N.J., USA. A possible mixture composition CB7CB:CB6OCB:5CB:S811 (in weight units) is 30:20:45:5 (cholesteric phase in the range 20.0° C.-66.5° C.). Alternatively, other sorts of achiral dimer molecules of the type CBnCB (of which CB7CB is one example) may be used to form chiral heliconical liquid crystal materials, as reported by Chen et al., in "Chiral heliconical ground state of nanoscale pitch in a nematic liquid crystal of achiral molecular dimers," *Proceedings of the National Academy of Sciences of the U.S.A.* 110(40), pages 15931-15936 (2013).

Another example of a liquid crystal that can be used in material 24 is UD68, wherein the liquid crystal is achiral but the twist-bend nematic phase is chiral, as reported by Chen et al., in "Twist-bend heliconical chiral nematic liquid crystal phase of an achiral rigid bent-core mesogen," *Physical Review E* 89, page 22506 (2014).

Alternatively, other mixtures of liquid crystals with or without chiral additives (left- or right-handed) may be used to create heliconical liquid crystal materials with pitch in the desired range, and such mixtures are considered to be within the scope of the present invention.

Applying an electrical field along helicoidal axis 38 has the effect of decreasing both tilt angle θ and pitch P, thus modifying the effective refractive index. However, as opposed to CLC, the helical structure of heliconical liquid crystal material 24 is preserved under the applied electrical field, and the material exhibits a polarization-independent optical path length, which varies with the varying electrical field. This feature enables a continuous and polarization-independent phase modulation in optical device 20.

An additional advantage of heliconical liquid crystal material 24 is that, by decreasing pitch P by an applied electrical field, the wavelength $\lambda_{Bragg}$ for Bragg-reflections, mentioned above, may be moved to ultraviolet (UV) wavelengths in case the zero-field pitch results in Bragg-reflection in the visible spectrum.

Polarization-Independence Using Multiple Lenses

As noted earlier, a polarization-independent lens may be assembled by stacking two polarization-dependent lenses. The two polarization-dependent lenses are designed to affect polarized light in polarizations P1 and P2 respectively, wherein P1 and P2 are orthogonal. The first lens operates as a lens for P1 polarized light, but does not affect light in the orthogonal P2 polarization. Similarly, the second lens operates as a lens for P2 polarized light, but does not affect light in the orthogonal P1 polarization. Therefore, the combination of the two lenses operates as one polarization-independent lens.

A lens positioned opposite an eye causes a magnification M of the image on the retina, compared to an image created on the retina without a corrective lens. For positive lenses the image is magnified (M>1), while for negative powers the image size is reduced (M<1). The magnification depends not only on the focal length of the lens, but also on the distance between the pupil and the lens. A larger distance between the pupil and the lens, as well as a shorter focal length of the lens, will result in a larger effect on the magnification.

When the polarization-independent lens described above is placed opposite an eye, the two lens elements composing the device are positioned at different distances from the pupil. Therefore, the image on the retina will be constructed of P1 polarized light focused by the first lens element with magnification M1, and P2 polarized light focused by the second lens element with magnification M2. If M1 and M2 are not equal, this can result in a doubling of the image of the retina, thus lowering the perceived sharpness and overall quality of the image.

In an embodiment of the present invention, the focal lengths of the two lenses are controlled so that their difference compensates for the distance separating the lenses so as to equalize the magnifications M1 and M2 for the retinal images at the two polarizations P1 and P2, respectively. Since magnification cannot be controlled independently from focus, equalizing the magnifications M1 and M2 implies that one or both of the retinal images at the two polarizations P1 and P2 are not in a sharp focus. Equalizing the magnifications rather than focusing both polarizations is preferable, as a slight loss of image resolution (with equal magnifications) is tolerated better by the human visual perception than a sharp double image.

Figure 3:
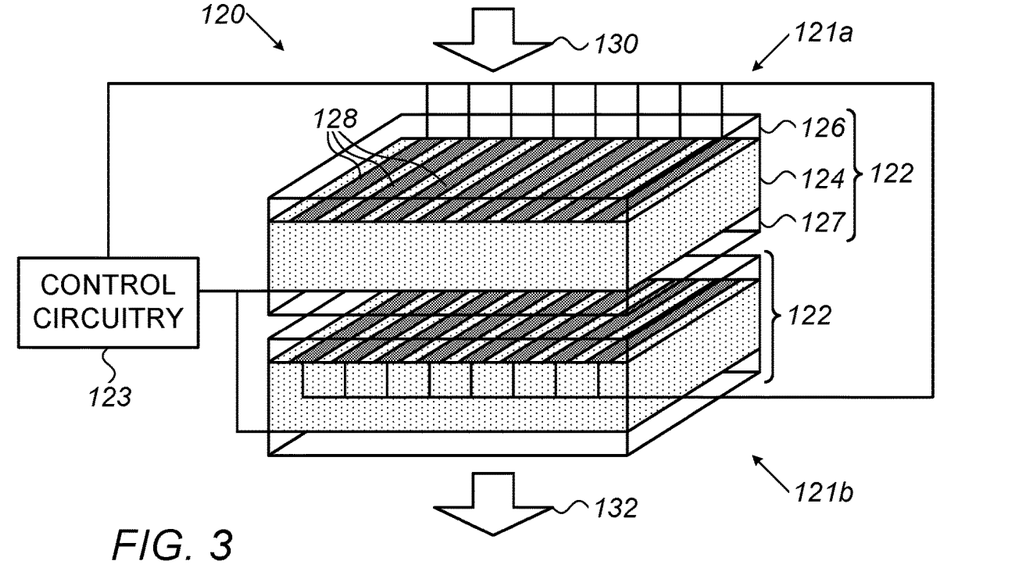
FIG. 3 is a schematic perspective view of a polarization-independent optical device, in accordance with an embodiment of the present invention.

FIG. 3 is a schematic perspective view of a polarization-independent optical device 120, in accordance with another embodiment of the present invention. Optical device 120 comprises two polarization-dependent lenses 121a and 121b, each comprising an optical phase modulator 122 and control circuitry 123. Although control circuitry 123 is shown as a unitary component, it could as well comprise a separate component for each of the two lenses 121a and 121b. Optical phase modulator 122 comprises an electro-optical layer 124, which typically comprises nematic or other birefringent liquid crystal material, sandwiched between an upper substrate 126 and a lower substrate 127, wherein the substrates comprise a transparent material, for example, glass. The inner surfaces of upper substrate 126 and lower substrate 127 can be coated with an alignment layer, such as polyimide, as referred to above.

Optical phase modulator 122 of lens 121b is similar to the optical phase modulator of lens 121a. Electro-optical layer 124 is typically contained by suitable encapsulation, as is known in the art.

Light impinges on optical device 120 as an incident light 130, and exits the phase modulators as a transmitted light 132. The optical phase of transmitted light 132 is locally modified, with respect to the optical phase of incident light 130, by the local optical path through electro-optical layers 124. The local optical path is modified in response to applied control voltage waveforms, as will be detailed below. As electro-optical layers 124 are typically birefringent, the modification of the optical phase in each of lenses 121a and 121b affects only one polarization of transmitted light 132. Therefore, lenses 121a and 121b are arranged so that the respective electro-optical layers 124 operate on orthogonal polarizations of light.

Excitation electrodes 128 and 129 are disposed over substrates 126 and 127, respectively. Control circuitry 123 is coupled to excitation electrodes 128 and 129, and is configured to apply control voltage waveforms to the excitation electrodes, modifying the local optical path through electro-optical layers 124 according to the local control voltage waveform. The features of electrodes 28 and 29 and control circuitry 23 that were described above are likewise applicable, mutatis mutandis, to electrodes 128 and 129 and control circuitry 123.

Figure 4A:
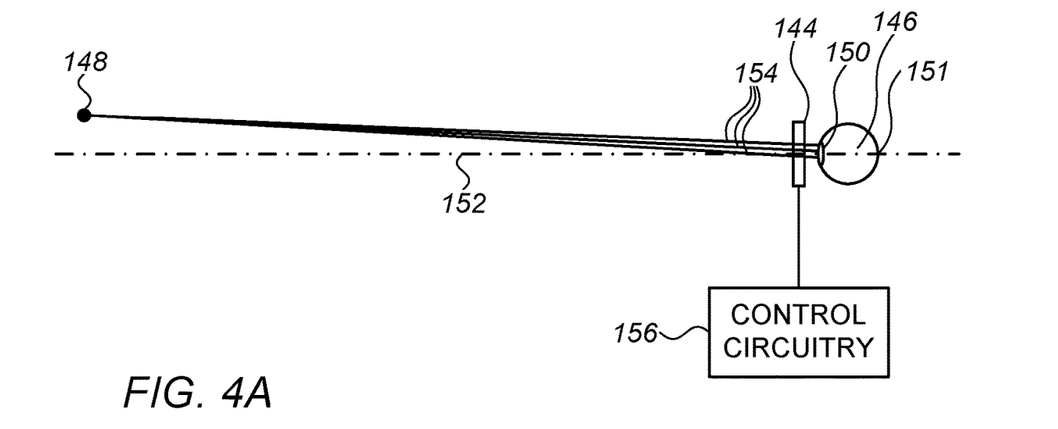
FIGS. 4A-B are schematic side views of a polarization-independent ophthalmic lens, in accordance with an embodiment of the present invention.
Figure 4B:
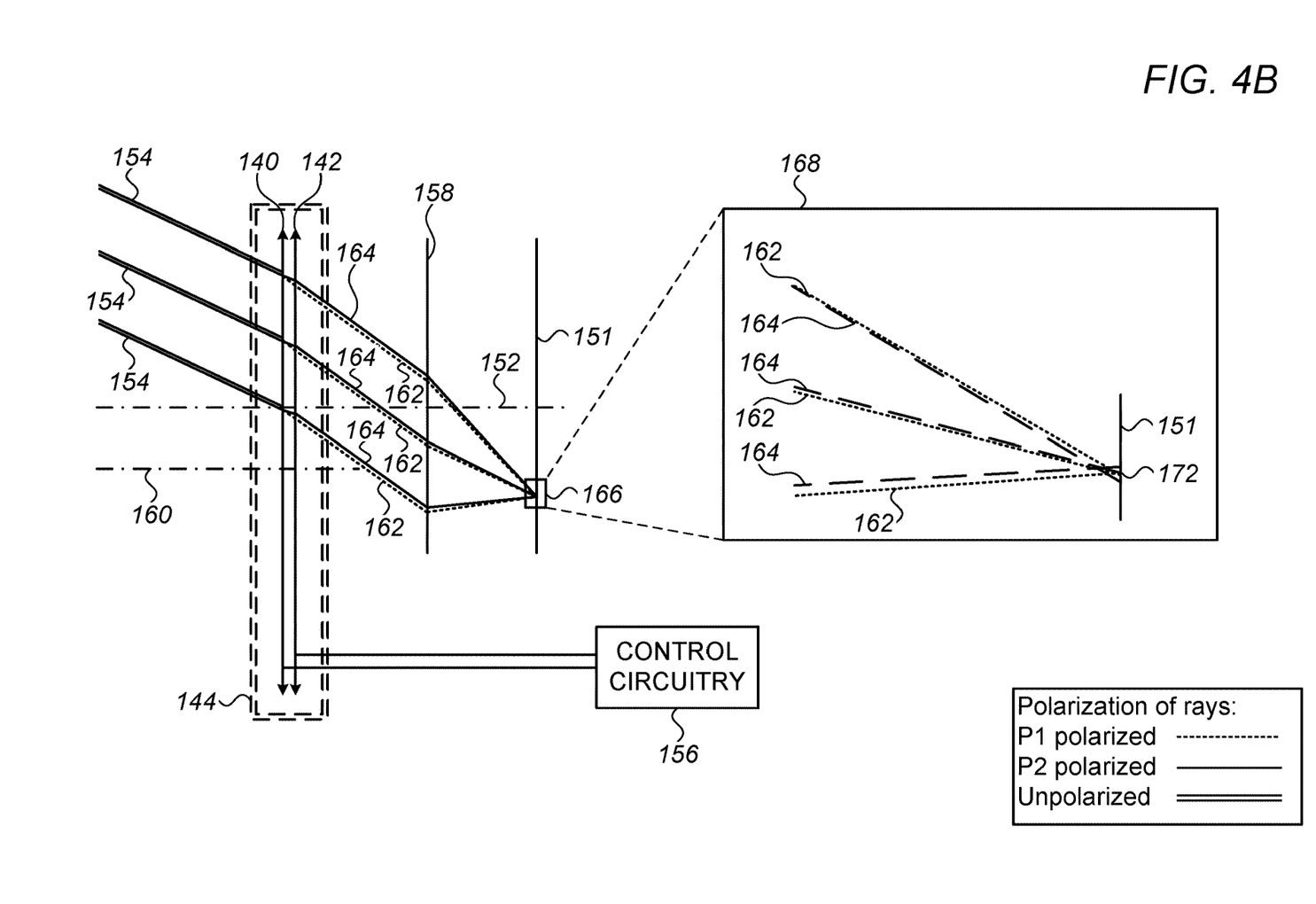

FIGS. 4A-B are schematic side views of the use of two polarization-dependent lenses 140 and 142 as a polarization-independent ophthalmic lens 144, in accordance with an embodiment of the present invention. Lenses 140 and 142 are constructed and operate, for example, in accordance with the principles of device 120 described above.

FIG. 4A shows an eye 146 viewing an object point 148 with the aid of polarization-independent ophthalmic lens 144. In the present example, object point 148 is located 33 cm to the left from a pupil 150 of eye 146, and 3 cm above an optical axis 152 of the eye, although other distances and heights of the object point may be handled in similar fashion. Polarization-independent ophthalmic lens 144, comprising polarization-dependent lenses 140 and 142 (shown in FIG. 4B), is located in front of eye 146. Optical rays 154 travel from object point 148 through polarization-independent ophthalmic lens 144 into eye 146 through its pupil 150, and image the object point onto a retina 151 of the eye. Polarization-independent ophthalmic lens 144 is, through its component lenses 140 and 142, coupled to control circuitry 156.

FIG. 4B is a schematic raytrace of optical rays 154 from object point 148 (outside FIG. 4B, but shown in FIG. 4A) traversing polarization-dependent lenses 140 and 142 and continuing to eye 146. Polarization-dependent lenses 140 and 142, with orthogonal polarization axes, together make up polarization-independent ophthalmic lens 144, shown by a double dotted line. Lens 140 refracts rays of polarization P1 and lens 142 refracts rays of polarization P2. For clarity, polarization-dependent lenses 140 and 142 are drawn schematically as thin lenses, and eye 146 is represented schematically as a pupil plane 158 (representing pupil 150) and retina 151.

In the present example, polarization-dependent lenses 140 and 142 are located at respective distances of 2.2 cm and 2.0 cm to the left of pupil plane 158. The optical centers of both polarization-dependent lenses 140 and 142 are shifted to 1 cm below optical axis 152 of eye 146, defining an optical axis 160 for polarization-independent ophthalmic lens 144. Rays 154, shown as double solid lines, arrive from object point 148 impinging first on lens 140. Lens 140 refracts rays of polarization P1, which then pass through lens 142 without refracting. Rays of polarization P2 are not refracted by lens 140, but are refracted by lens 142. Rays 154 are, through refraction, separated by lenses 140 and 142 into rays 162 of polarization P1 (drawn as dotted lines) and rays 164 of polarization P2 (drawn as solid lines). Rays 162 and 164 are refracted at pupil plane 158, and image object point 148 onto retina 151.

Control circuitry 156 has adjusted the optical powers of lenses 140 and 142 to 3.25 D (D=diopters) and 3.3 D, respectively. With these optical powers object point 148 is imaged with the same magnification for the two polarizations P1 and P2. Imaging of object point 148 is shown in greater detail by expanding an area 166 to an area 168. Rays 162 of polarization P1 arrive at a point 172 on retina 151 in a sharp focus. Rays 164 of polarization P2 arrive at point 172 with a slight defocus. Both rays 162 and 164 are centered at or around point 172, which is equivalent to equal magnification of imaging for both polarizations P1 and P2. Due to its small value, the blur of rays 164 (polarization P2) has no significant effect on the visual perception of object point 148. Alternatively, the blur diameter could be further reduced by adjusting the optical powers of lenses 140 and 142 so that the images at both polarizations P1 and P2, still having equal magnification, are defocused by the same amount. However, were the optical powers of both lenses 140 and 142 adjusted by control circuitry 156 for a sharp focus on retina 151 (in the disclosed embodiment to 3.25 D for lens 140 and to 3.22 D for lens 142), the lateral distance between the two sharp images of object point 148 on the retina would be 15 μm, which would be perceived as an objectionable double image.

Polarization-independent ophthalmic lens 144, as well as polarization-dependent lenses 140 and 142, are described in the disclosed embodiment as positive lenses. Alternatively, lenses 140 and 142 may similarly be configured as negative lenses, and the principles explained above may similarly be applied in adjusting the respective optical powers.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
    a first polarization-dependent lens, which comprises:
        a first electro-optical layer, which is configured to refract a first polarization component of light propagating along an optical path, with a first focal length that is determined by first control voltage waveforms applied across the first electro-optical layer; and
        first excitation electrodes extending across the first electro-optical layer;
    a second polarization-dependent lens, which is arranged at a predefined distance from the first polarization-dependent lens along the optical path and comprises:
        a second electro-optical layer, which is configured to refract a second polarization component of the light, orthogonal to the first polarization component, with a second focal length that is determined by second control voltage waveforms applied across the second electro-optical layer; and
        second excitation electrodes extending across the second electro-optical layer; and
    control circuitry, which is coupled to apply the first and second control voltage waveforms respectively to the first and second excitation electrodes and is configured to modify the first and second control voltage waveforms so that both the first and second polarization components are imaged onto a focal plane with equal magnifications.

2. The optical device according to claim 1, wherein the first and second polarization-dependent lenses are configured to serve as an ophthalmic lens with an electrically-controllable focal length, and wherein the first and second focal lengths are chosen so that both the first and second polarization components are imaged on a retina of a user of the ophthalmic lens with equal magnifications.

3. The optical device according to claim 1, wherein the control circuitry is configured to set the control voltage waveforms so that a difference between the first and second focal lengths compensates for the predefined distance so as to equalize the magnifications of the first and second polarization components at the focal plane.

4. The optical device according to claim 3, wherein when the control voltage waveforms are set so as to equalize the magnifications of the first and second polarization components at the focal plane, at least one of the first and second polarization components is defocused at the focal plane.

5. The optical device according to claim 1, wherein the first and second electro-optical layers comprise liquid crystals.

6. The optical device according to claim 1, wherein the first and second electrodes respectively comprise arrays of parallel conductive stripes.

7. A method for producing an optical device, the method comprising:
  providing a first polarization-dependent lens, comprising:
    a first electro-optical layer, which is configured to refract a first polarization component of light propagating along an optical path, with a first focal length that is determined by first control voltage waveforms applied across the first electro-optical layer; and
    first excitation electrodes extending across the first electro-optical layer;
  arranging a second polarization-dependent lens at a predefined distance from the first polarization-dependent lens along the optical path, wherein the second polarization-dependent lens comprises:
    a second electro-optical layer, which is configured to refract a second polarization component of the light, orthogonal to the first polarization component, with a second focal length that is determined by second control voltage waveforms applied across the second electro-optical layer; and
    second excitation electrodes extending across the second electro-optical layer; and
  coupling control circuitry to apply the first and second control voltage waveforms respectively to the first and second excitation electrodes and to modify the first and second control voltage waveforms so that both the first and second polarization components are imaged onto a focal plane with equal magnifications.

8. The method according to claim 7, and comprising configuring the first and second polarization-dependent lenses to serve as an ophthalmic lens with an electrically-controllable focal length, and choosing the first and second focal lengths so that both the first and second polarization components are imaged on a retina of a user of the ophthalmic lens with equal magnifications.

9. The method according to claim 7, wherein coupling the control circuitry comprises setting the control voltage waveforms so that a difference between the first and second focal lengths compensates for the predefined distance so as to equalize the magnifications of the first and second polarization components at the focal plane.

10. The method according to claim 9, wherein when the control voltage waveforms are set so as to equalize the magnifications of the first and second polarization components at the focal plane, at least one of the first and second polarization components is defocused at the focal plane.

11. The method according to claim 7, wherein the first and second electro-optical layers comprise liquid crystals.

12. The method according to claim 7, wherein the first and second electrodes respectively comprise arrays of parallel conductive stripes.

* * * * *